US008131816B2

(12) United States Patent
Robinson et al.

(10) Patent No.: US 8,131,816 B2
(45) Date of Patent: *Mar. 6, 2012

(54) METHODS AND APPARATUS FOR GENERATING GRAPHICAL AND MEDIA DISPLAYS AT A CLIENT

(75) Inventors: David Robinson, Carlingford (AU); Lee George Laborczfalvi, Wollstonecraft (AU); Pierre Semaan, Forestville (AU); Anil Roychoudhry, Woodcroft (AU); Martin Duursma, West Pennant Hills (AU); Anatoliy Panasyuk, Bellevue, WA (US); Georgy Momchilov, Coconut Creek, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1727 days.

This patent is subject to a terminal disclaimer.

(21) Appl. No.: 10/507,469

(22) PCT Filed: Mar. 14, 2003

(86) PCT No.: PCT/US03/07965
§ 371 (c)(1),
(2), (4) Date: Mar. 18, 2005

(87) PCT Pub. No.: WO03/079212
PCT Pub. Date: Sep. 25, 2003

(65) Prior Publication Data
US 2005/0198189 A1   Sep. 8, 2005

(51) Int. Cl.
*G06F 15/16* (2006.01)
(52) U.S. Cl. .................. 709/217; 709/203; 709/246
(58) Field of Classification Search .............. 709/203, 709/217, 246
See application file for complete search history.

(56) References Cited

U.S. PATENT DOCUMENTS

| 4,013,828 | A | 3/1977 | Judice |
|---|---|---|---|
| 4,410,916 | A | 10/1983 | Pratt et al. |

(Continued)

FOREIGN PATENT DOCUMENTS

EP   0 283 735   9/1988

(Continued)

OTHER PUBLICATIONS

Mike Stock, "Technologies for Thin Client Architectures", Jan. 7, 2001, Department of Information Technology, University of Zurich, pp. 1-120.*

(Continued)

*Primary Examiner* — Minh-Chau Nguyen
(74) *Attorney, Agent, or Firm* — Foley & Lardner LLP; John D. Lanza

(57) ABSTRACT

The invention generally relates to generating a display having graphical and/or media components at a client. In one aspect, a method for generating a graphical display at a client includes transmitting output from an application program executing on a server to the client, identifying a non-textual element within the application output, retrieving a compressed data format associated with the non-textual element, and transmitting to the client the compressed data format in place of the non-textual element. In another aspect, a method for generating a media presentation at a client includes transmitting output from an application program executing on a server to the client, identifying a media stream within the application output, intercepting an original compressed data set representing at least a portion of the media stream before processing by the application program, and transmitting the original compressed data set to the client.

36 Claims, 6 Drawing Sheets

U.S. PATENT DOCUMENTS

| | | | |
|---|---|---|---|
| 4,463,424 | A | 7/1984 | Mattson et al. |
| 4,499,499 | A | 2/1985 | Brickman et al. |
| 4,562,423 | A | 12/1985 | Humblet |
| 4,701,745 | A | 10/1987 | Waterworth |
| 4,796,003 | A | 1/1989 | Bentley et al. |
| 4,807,029 | A | 2/1989 | Tanaka |
| 4,860,247 | A | 8/1989 | Uchida et al. |
| 4,862,392 | A | 8/1989 | Steiner |
| 4,870,662 | A | 9/1989 | Lindbergh et al. |
| 4,899,149 | A | 2/1990 | Kahan |
| 4,903,218 | A | 2/1990 | Longo et al. |
| 4,928,247 | A | 5/1990 | Doyle et al. |
| 4,937,036 | A | 6/1990 | Beard et al. |
| 4,949,281 | A | 8/1990 | Hillenbrand et al. |
| 4,958,303 | A | 9/1990 | Assarpour et al. |
| 4,992,954 | A | 2/1991 | Takeda et al. |
| 5,001,478 | A | 3/1991 | Nagy |
| 5,016,009 | A | 5/1991 | Whiting et al. |
| 5,049,881 | A | 9/1991 | Gibson et al. |
| 5,051,745 | A | 9/1991 | Katz |
| 5,072,412 | A | 12/1991 | Henderson et al. |
| 5,103,303 | A | 4/1992 | Shoji et al. |
| 5,115,479 | A | 5/1992 | Murayama |
| 5,119,319 | A | 6/1992 | Tanenbaum |
| 5,126,739 | A | 6/1992 | Whiting et al. |
| 5,155,485 | A | 10/1992 | Sako et al. |
| 5,161,015 | A | 11/1992 | Citta et al. |
| 5,164,727 | A | 11/1992 | Zakhor et al. |
| 5,231,697 | A | 7/1993 | Yamada |
| 5,241,625 | A | 8/1993 | Epard et al. |
| 5,309,555 | A | 5/1994 | Akins et al. |
| 5,315,698 | A | 5/1994 | Case et al. |
| 5,321,806 | A | 6/1994 | Meinerth et al. |
| 5,351,129 | A | 9/1994 | Lai |
| 5,384,568 | A | 1/1995 | Grinberg et al. |
| 5,406,279 | A | 4/1995 | Anderson et al. |
| 5,414,457 | A | 5/1995 | Kadowaki et al. |
| 5,455,576 | A | 10/1995 | Clark et al. |
| 5,469,540 | A | 11/1995 | Powers et al. |
| 5,473,742 | A | 12/1995 | Polyakov et al. |
| 5,481,704 | A | 1/1996 | Pellicano |
| 5,485,460 | A | 1/1996 | Schrier et al. |
| 5,515,111 | A | 5/1996 | Guedalia |
| 5,515,508 | A | 5/1996 | Pettus et al. |
| 5,521,597 | A | 5/1996 | Dimitri |
| 5,526,349 | A | 6/1996 | Diaz et al. |
| 5,537,551 | A | 7/1996 | Denenberg et al. |
| 5,557,749 | A | 9/1996 | Norris |
| 5,566,288 | A | 10/1996 | Koerhsen |
| 5,572,206 | A | 11/1996 | Miller et al. |
| 5,577,188 | A | 11/1996 | Zhu |
| 5,579,469 | A | 11/1996 | Pike |
| 5,623,603 | A | 4/1997 | Jiang et al. |
| 5,652,909 | A | 7/1997 | Kodosky |
| 5,657,390 | A | 8/1997 | Elgamal et al. |
| 5,659,685 | A | 8/1997 | Williams et al. |
| 5,664,129 | A | 9/1997 | Futatsugi et al. |
| 5,740,171 | A | 4/1998 | Mazzola et al. |
| 5,742,778 | A | 4/1998 | Hao et al. |
| 5,757,925 | A | 5/1998 | Faybishenko |
| 5,767,849 | A | 6/1998 | Borgendale et al. |
| 5,771,034 | A | 6/1998 | Gibson |
| 5,784,070 | A | 7/1998 | Furuhashi et al. |
| 5,784,570 | A | 7/1998 | Funkhouser |
| 5,826,027 | A | 10/1998 | Pedersen et al. |
| 5,844,553 | A | 12/1998 | Hao et al. |
| 5,862,347 | A | 1/1999 | Suzuki et al. |
| 5,864,678 | A | 1/1999 | Riddle |
| 5,864,711 | A | 1/1999 | Mairs et al. |
| 5,874,960 | A | 2/1999 | Mairs et al. |
| 5,877,757 | A | 3/1999 | Baldwin et al. |
| 5,881,230 | A | 3/1999 | Corbin |
| 5,918,019 | A | 6/1999 | Valencia |
| 5,944,791 | A | 8/1999 | Scherpbier |
| 5,949,975 | A | 9/1999 | Batty et al. |
| 5,953,503 | A * | 9/1999 | Mitzenmacher et al. ..... 709/203 |
| 5,956,490 | A | 9/1999 | Buchholz et al. |
| 5,961,588 | A | 10/1999 | Cooper et al. |
| 5,968,132 | A | 10/1999 | Tokunaga et al. |
| 5,983,190 | A | 11/1999 | Trower et al. |
| 5,996,022 | A | 11/1999 | Krueger et al. |
| 5,999,179 | A | 12/1999 | Kekic et al. |
| 5,999,950 | A | 12/1999 | Krueger et al. |
| 6,014,133 | A | 1/2000 | Yamakado et al. |
| 6,034,689 | A | 3/2000 | White et al. |
| 6,052,120 | A | 4/2000 | Nahi et al. |
| 6,057,857 | A | 5/2000 | Bloomfield |
| 6,061,714 | A | 5/2000 | Housel et al. |
| 6,081,623 | A | 6/2000 | Bloomfield et al. |
| 6,112,244 | A | 8/2000 | Moore et al. |
| 6,112,250 | A | 8/2000 | Appelman |
| 6,148,340 | A * | 11/2000 | Bittinger et al. ............. 709/224 |
| 6,161,126 | A | 12/2000 | Wies et al. |
| 6,178,461 | B1 | 1/2001 | Chan et al. |
| 6,182,125 | B1 | 1/2001 | Borella et al. |
| 6,185,625 | B1 | 2/2001 | Tso et al. |
| 6,233,571 | B1 | 5/2001 | Egger et al. |
| 6,240,442 | B1 | 5/2001 | Domenikos et al. |
| 6,256,662 | B1 | 7/2001 | Lo et al. |
| 6,282,542 | B1 | 8/2001 | Carneal et al. |
| 6,308,222 | B1 | 10/2001 | Krueger et al. |
| 6,345,279 | B1 | 2/2002 | Li et al. |
| 6,353,839 | B1 | 3/2002 | King et al. |
| 6,392,648 | B1 | 5/2002 | Florenca |
| 6,427,149 | B1 * | 7/2002 | Rodriguez et al. ............ 709/219 |
| 6,430,591 | B1 | 8/2002 | Goddard |
| 6,449,658 | B1 | 9/2002 | Lafe et al. |
| 6,473,609 | B1 | 10/2002 | Schwartz et al. |
| 6,507,867 | B1 | 1/2003 | Holland et al. |
| 6,522,268 | B2 * | 2/2003 | Belu ............................... 341/51 |
| 6,704,024 | B2 * | 3/2004 | Robotham et al. ............ 345/581 |
| 6,911,979 | B2 | 6/2005 | Nakatani |
| 7,103,105 | B2 * | 9/2006 | Oh et al. ................... 375/240.27 |
| 7,143,109 | B2 * | 11/2006 | Nagral et al. .......................... 1/1 |
| 7,376,695 | B2 | 5/2008 | Duursma et al. |
| 2002/0085036 | A1 | 7/2002 | Nakatani |
| 2002/0107988 | A1 | 8/2002 | Jordan |
| 2002/0162068 | A1 * | 10/2002 | Meggers ........................ 714/758 |
| 2003/0004933 | A1 * | 1/2003 | Ben-Yehezkel ................... 707/3 |
| 2003/0120714 | A1 | 6/2003 | Wolff et al. |
| 2004/0049598 | A1 * | 3/2004 | Tucker et al. .................. 709/246 |

FOREIGN PATENT DOCUMENTS

| | | |
|---|---|---|
| EP | 0 384 339 A2 | 8/1990 |
| EP | 0 483 576 B1 | 5/1992 |
| EP | 0 643 514 A2 | 3/1995 |
| EP | 0 648 038 A2 | 4/1995 |
| EP | 0 691 628 | 1/1996 |
| EP | 0 739 140 | 10/1996 |
| EP | 0 767 563 A2 | 4/1997 |
| EP | 0 836 145 | 4/1998 |
| EP | 0 682 583 | 5/1998 |
| EP | 0 841 615 A2 | 5/1998 |
| GB | 2 136 171 | 9/1984 |
| JP | 06-125363 | 5/1994 |
| JP | 06-332782 A0 | 12/1994 |
| WO | WO 93/15457 A1 | 8/1993 |
| WO | WO-94/03853 | 2/1994 |
| WO | WO-94/14114 A1 | 6/1994 |
| WO | WO-95/20863 | 8/1995 |
| WO | WO-97/18635 | 5/1997 |
| WO | WO-97/28623 A3 | 8/1997 |
| WO | WO-98/52320 A2 | 11/1998 |
| WO | WO-01/92973 | 12/2001 |

OTHER PUBLICATIONS

Bar-Ness, "Word Based Data Compression Schemes", IEEE International Symposium on Circuies and and Systems, 1989, vol. 1, pp. 300-303.

Bursk et al. "A Brief Discussion of Switched Access to Frame Relay Services and Frame Relay Switched Virtual Circuits." Frame Relay Forum, Feb. 1996, pp. 1-7.

Citrix MetaFrame 1.8 Backgrounder., Apr. 1999, pp. 1-34.

Citron, "Creating a Wider Bus Using Caching Techniques", IEEE, 1995 pp. 90-99.

European Search Report for 10184329.0 dated Dec. 6, 2010.

European Search Report for 10184337.3 dated Dec. 28, 2010.

Freeman, H., "Computer Processing of Line-Drawing Images", ACM Computing Surveys, New York, NY, US, vol. 6, No. 1, pp. 57-97, Mar. 1974.

Hayashi, "A New Source Coding Method Based on LZW Adopting the Least Recently Used Deletion Heuristic", IEEE Pacific Rim Conference, 1993, vol. 1, pp. 190-193.

IBM Technical Disclosure Bulletin, "Mechanisms for Finding Substitute Fonts in a Conference-Enabled X Windows Application", vol. 41, No. 1, Jan. 1998 pp. 137-142.

IBM Technical Disclosure Bulletin, "Remote Desktop Environments Reflected in Local Desktop Windows", vol. 36 No. 3, Mar. 1993, pp. 421-426.

International Searching Authority, International Search Report, PCT Application No. PCT/US03/07965, mailed on Jun. 2, 2003, 4 pages.

Johnson, "Software Generates Data Delivery: Starburst MFTP is the first shrink-wrapper package to multicast data reliably over multiprotocol nets." Data Communications, Apr. 1995, vol. 42, No. 5, p. 45.

Klett, Jr. "Cisco attacks crowding on multimedia nets", Computerworld, Mar. 6, 1995, vol. 29, No. 10, p. 10.

Koppen et al "A practical approach towards active hyperlinked documents", Computer Networks and ISDN Systems 30 (1998) pp. 251-258.

Norton, "The Norton Utilities, Version 5.0 Disk Explorer", Computing, Inc., 1990, 28-54.

Notice of Allowance for U.S. Appl. No. 12/108,016 dated Jun. 23, 2011.

Office Action for U.S. Appl. No. 12/108,016 dated Aug. 23, 2010.

Patents on Data Compression Algorithms, taken from http://www-iapr-ic.dimi.uniud.it/Udne/WebRes/ImageCoding/compress/patents-.html, Mar. 31, 1998, pp. 1-10.

Salomon, Springer-Verlag, "Data Compression", New York, 1998, pp. 16-19.

Swallow, "Frame Relay PVC Multicast Service And Protocol Description", http://www.frforum.com, Oct. 1994, pp. 1-17.

Wallace, "ComNet '96: remote access server, Token Ring Switches among offerings", Computerworld, Feb. 5, 1996, vol. 30, No. 6, p. 14(1).

WebTV, "WebTV System Guide", http://developer.webtv.net/authoring/sysgde/sysgde.html, Sep. 13, 2000, pp. 1-12.

\* cited by examiner

METHODS AND APPARATUS FOR GENERATING GRAPHICAL AND MEDIA DISPLAYS AT A CLIENT

CROSS-REFERENCE TO RELATED APPLICATION

This application claims priority to co-pending U.S. patent application Ser. No. 10/098,157, filed Mar. 14, 2002, the entirety of which is incorporated herein by reference.

BACKGROUND

1. Field of Invention

The invention generally relates to distributed processing, and, more particularly, to generating a display having graphical and/or media components at a client.

2. Description of Prior Art

A thin-client protocol is used for displaying output, produced by an application running on a server, on a client with limited processing capabilities. Two exemplary thin client protocols are ICA, Independent Computing Architecture from Citrix Systems, Inc., Ft. Lauderdale, Fla. and RDP, Remote Desktop Protocol from Microsoft, Inc., Redmond, Wash. The client is also sometimes referred to as a remote terminal session. One thin-client protocol intercepts commands by the application program to the server operating system ("OS") to draw to a display screen. The intercepted commands are transmitted to the remote session using, for example, one or more presentation layer packets. When the remote session (e.g., thin-client) receives the command, the remote session passes the received commands to the remote session OS. The thin-client draws the application program output on its display using the received commands. In this manner, the application program appears to be executing on the thin-client.

Typically, when the application program draws images to the display screen, the image is represented as a bitmap. A bitmap format of an image is generally a very large data set. Thus, the thin-client protocol must transmit over the network the bitmap representation of an image, which is a large amount of data, along with the applicable commands on how to display the bitmap representation. For networks of low bandwidth, this results in a large time delay before the complete image is received and displayed on the client. This can result in inconvenience and unhappiness for the user of the client. Also, if the user is paying directly for bandwidth used, for example in a wireless network, transmission of these large bitmap formats results in large costs associated with each transmission.

A similar problem exists when the application program renders a media presentation. Typically, a video file is rendered as a series of bitmaps and audio information is rendered using pulse code modulation. Accordingly, the thin-client protocol transmits the series of bitmaps representing the video file and/or the pulse code modulated signal representing the audio information over the network. This transmission is inefficient, requiring excessive bandwidth and significant CPU usage. Moreover, even where sufficient bandwidth is available, an unresponsive graphical user interface may result at the client. Video playback, for example, is often of low quality, may appear "jerky," and may synchronize poorly with the audio presentation.

There is, therefore, a need for an improved approach to rendering images and media presentations in a remote terminal session.

SUMMARY OF THE INVENTION

The invention, according to one advantage, lowers the time and cost of transmitting images and other non-textual elements, originally represented in large bitmap formats, by substituting, prior to transmission, available compressed formats for the bitmap formats. Typically, transmitting the compressed formats instead of the bitmap formats can significantly reduce the necessary bandwidth. The client decompresses the received data using available libraries. The client then substitutes the decompressed image for the original bitmap representations using, for example, modified thin-client protocol commands with other identifying data.

According to another advantage of the invention, a compressed data set, representing at least a portion of a media stream, is intercepted on a first computing device before it is decompressed. Alternatively, where the compressed data set is decompressed on the first computing device, the resulting decompressed data set is re-compressed on the first computing device. By transmitting the compressed data set, rather than the decompressed data set, over a network, which may have limited bandwidth, the time and cost of transmitting the data set is consequently reduced.

In one aspect, the invention relates to a method for generating a graphical display at a client. The method includes transmitting output from an application program executing on a server to the client, identifying a bitmap representation within the application output, and determining a check value for the bitmap representation. The method also includes retrieving a compressed data format of the bitmap representation using at least in part the check value and transmitting to the client the compressed data format in place of the bitmap representation.

In another aspect, the invention relates to a method for generating a graphical display at a client. The method includes transmitting output from an application program executing on a server to the client and identifying a non-textual element within the application output. The method also includes retrieving a compressed data format associated with the non-textual element and transmitting to the client the compressed data format in place of the non-textual element.

In one embodiment of this aspect of the invention, the method includes identifying a textual element within the application output and transmitting to the client the textual element. In another embodiment, the method includes receiving the compressed data format, and optionally the textual element, at the client and generating a display at the client using the compressed data format, and optionally the textual element. In another embodiment, the method includes transmitting the compressed data format using at least one presentation layer protocol packet. In yet another embodiment, the method includes transmitting the at least one presentation layer protocol packet using a command for transmitting a file in its native format.

In another embodiment, the method includes conforming the at least one presentation layer protocol packet to a remote access protocol, a thin-client protocol, and/or a presentation protocol. In still another embodiment, the non-textual element is a bitmap representation and the method includes replacing the bitmap representation with the compressed data format. In another embodiment, the method includes determining the capability of the client to render the non-textual element using the compressed data format. The method further includes, upon determination that the client cannot render the non-textual element using the compressed data format, transmitting an image-rendering library capable of rendering the non-textual element using the compressed data format.

In another embodiment, the method includes intercepting the application output and inspecting the intercepted output for a bitmap representation of the non-textual element. In yet another embodiment, the method includes calculating a first check value for a bitmap representation of the non-textual element and searching an image store for the compressed data format having a check value identical to the first check value.

In another aspect, the invention relates to a system for generating a graphical display at a client. The system includes an output filter module and a server agent. The output filter module is configured to intercept output produced by an application program, identify a non-textual element of the output, and retrieve a compressed data format associated with the non-textual element. The server agent is configured to transmit to the client the compressed data format in place of the non-textual element.

In one embodiment of this aspect of the invention, the system includes a server node, which includes the server agent and the output filter module. In another embodiment, the system includes a client node. The client node includes a client agent and a display. The client agent is configured to receive the compressed data format and to generate a display of the non-textual element using the received compressed data format. In another aspect, the system further includes a network.

In another aspect the invention relates to an article of manufacture having computer-readable program means embodied therein for generating a graphical display at a client. The article includes computer-readable program means for performing any of the aforementioned methods.

In an additional aspect, the invention relates to a method for generating a media presentation at a client. The method includes transmitting output from an application program executing on a server to the client, identifying a media stream within the application output, intercepting an original compressed data set representing at least a portion of the media stream before processing by the application program, and transmitting the original compressed data set to the client.

In another aspect, the invention relates to another method for generating a media presentation at a client. This method includes transmitting output from an application program executing on a server to the client, identifying a media stream within the application output, intercepting a first decompressed data set representing at least a portion of the media stream, compressing the intercepted first decompressed data set, and transmitting the compressed data set to the client in place of the first decompressed data set.

In yet another aspect, the invention relates to still another method for generating a media presentation at a client. This method includes informing a server of at least one media format supported by a client agent installed on the client, receiving a compressed data set of a media stream at the client, decompressing the compressed data set at the client to generate a decompressed data set, and generating the media presentation at the client using the decompressed data set.

In a further aspect, the invention relates to an article of manufacture that embodies computer-readable program means for generating a media presentation at a client. The article includes computer-readable program means for transmitting output from an application program executing on a server to the client, computer-readable program means for identifying a media stream within the application output, computer-readable program means for intercepting an original compressed data set representing at least a portion of the media stream before processing by the application program, and computer-readable program means for transmitting the original compressed data set to the client.

In still another aspect, the invention relates to another article of manufacture that embodies computer-readable means for generating a media presentation at a client. This article includes computer-readable program means for transmitting output from an application program executing on a server to the client, computer-readable program means for identifying a media stream within the application output, computer-readable program means for intercepting a first decompressed data set representing at least a portion of the media stream, computer-readable program means for compressing the intercepted first decompressed data set, and computer-readable program means for transmitting the compressed data set to the client in place of the first decompressed data set.

In yet another aspect, the invention relates to yet another article of manufacture that embodies computer-readable means for generating a media presentation at a client. This article includes computer-readable program means for informing a server of at least one media format supported by a client agent installed on the client, computer-readable program means for receiving a compressed data set of a media stream at the client, computer-readable program means for decompressing the compressed data set at the client to generate a decompressed data set, and computer-readable program means for generating the media presentation at the client using the decompressed data set.

In various embodiments of these last six aspects of the invention, the methods further include, and the articles of manufacture further include computer-readable program means for, capturing timing information associated with the media stream, transmitting the timing information to the client, receiving the compressed data set and, optionally, the timing information at the client, decompressing the compressed data set at the client to generate a decompressed data set, and generating the media presentation at the client using the decompressed data set and, optionally, the timing information. In other embodiments of the last six aspects of the invention, the methods further include, and the articles of manufacture further include computer-readable program means for, transmitting non-media graphical information from the application output to the client, receiving the non-media graphical information at the client, and generating the media presentation at the client using the decompressed data set and the non-media graphical information.

In an additional aspect, the invention relates to a system for generating a media presentation at a client. The system includes an application program and an output filter module. The application program is configured to identify a media stream within output produced by the application program. The output filter module is configured to intercept an original compressed data set representing at least a portion of the media stream before processing by the application program and transmit the original compressed data set to the client.

In another aspect, the invention relates to another system for generating a media presentation at a client. This system includes an application program and an output filter module. The application program is configured to identify a media stream within output produced by the application program. The output filter module is configured to intercept a first decompressed data set representing at least a portion of the media stream, compress the intercepted first decompressed data set of the media stream, and transmit the compressed data set in place of the first decompressed data set to the client.

In yet another aspect, the invention relates to another system for generating a media presentation at a client. This system includes a server and the client in communication with the server. The client includes a client agent configured to inform the server of at least one media format supported by the client agent, receive a compressed data set of a media stream, decompress the compressed data set at the client to generate a decompressed data set, and generate the media presentation using the decompressed data set.

In various embodiments of these last three aspects of the invention, the output filter module of the systems is further configured to capture timing information associated with the media stream and to transmit the timing information to the client. In various other embodiments of the last three aspects of the invention, the system further includes a client agent configured to receive the compressed data set and the optional timing information, decompress the compressed data set to generate a decompressed data set, and generate the media presentation using the decompressed data set and the optional timing information. In still other embodiments of the last three aspects of the invention, the client agent is further configured to receive non-media graphical information and to generate the media presentation at the client using the decompressed data set and the non-media graphical information.

In another aspect, the invention relates to another system for generating a media presentation at a client. This system includes a network, a server in communication with the network, and the client in communication with the network. The server includes an application program and at least one output filter module. The application program is configured to identify a media stream within output produced by the application program. The output filter module is configured to intercept a compressed data set representing at least a portion of the media stream before processing by the application program, and transmit the compressed data set to the client. The client includes a client agent. The client agent is configured to inform the server of at least one media format supported by the client agent, receive the compressed data set, decompress the compressed data set at the client to generate a decompressed data set, and generate the media presentation at the client using the decompressed data set.

In a further aspect, the invention relates to an article of manufacture that embodies computer-readable program means for generating a media presentation at a client. The article includes computer-readable program means for intercepting an original compressed data set of a media stream, and computer-readable program means for transmitting the original compressed data set to the client using a thin client protocol such as ICA or RDP.

In another aspect, the invention relates to another article of manufacture that embodies computer-readable program means for generating a media presentation at a client. The article includes computer-readable program means for intercepting a decompressed data set of a media stream, computer-readable program means for compressing the intercepted decompressed data set, and computer-readable program means for transmitting the compressed data set to the client using a thin client protocol such as ICA or RDP.

BRIEF DESCRIPTION OF THE DRAWINGS

The above and further advantages of the invention may be better understood by referring to the following description taken in conjunction with the accompanying drawings, in which.

DETAILED DESCRIPTION

In one aspect, the invention pertains to methods, systems, and articles of manufacture for generating a graphical display. A compressed data format, associated with a non-textual element or a bitmap representation of an image, is transmitted over a network from a server to a client, in place of the non-textual element or the bitmap representation, for subsequent display.

Figure 1:
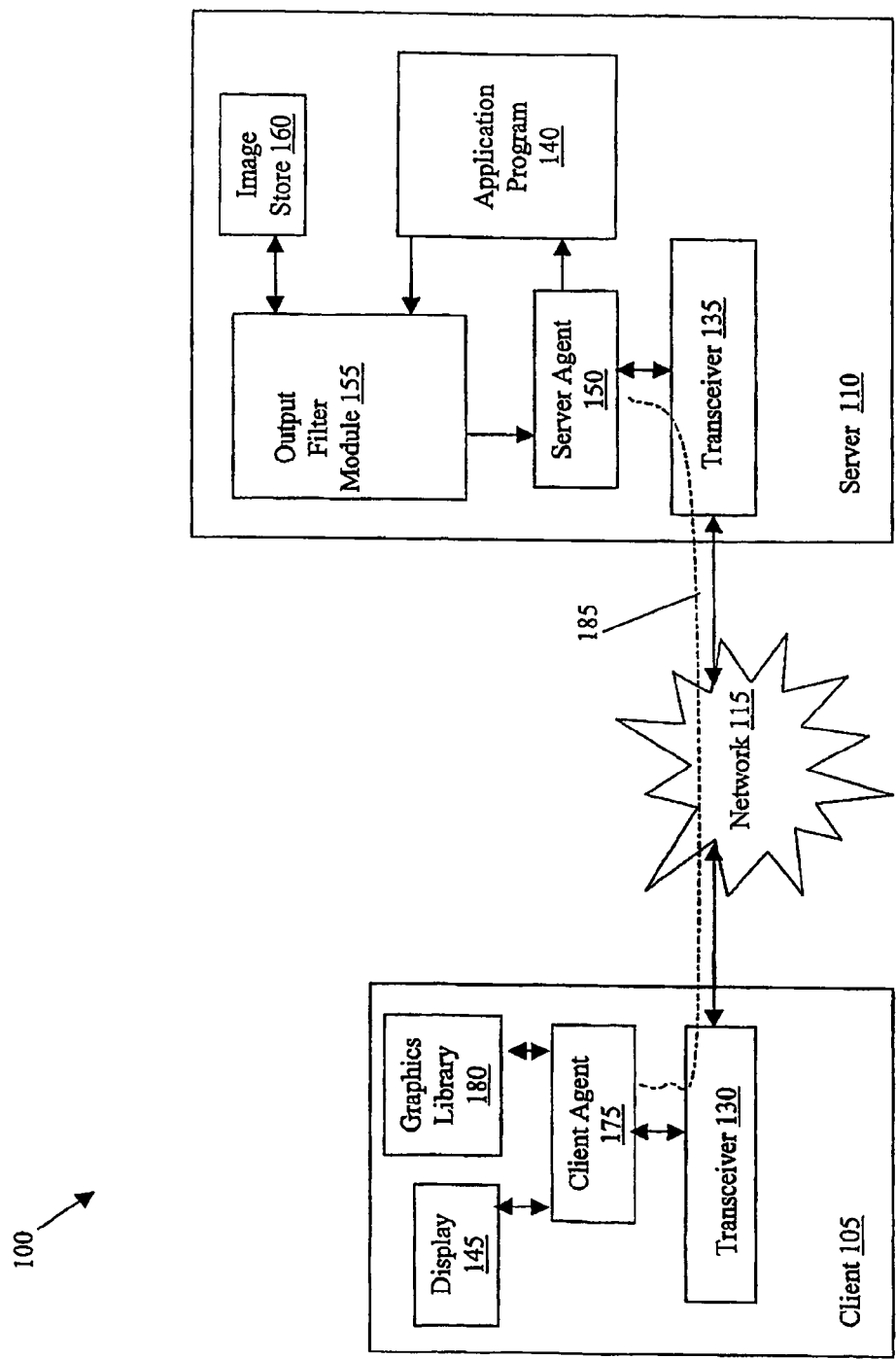
FIG. 1 is a block diagram of an illustrative embodiment of a system to generate a graphical display for a remote terminal session in accordance with the invention.

In broad overview, FIG. 1 illustrates a system 100 to generate a display for a remote terminal session that includes a first computing system ("client node") 105 in communication with a second computing system ("server node") 110 over a network 115. For example, the network 115 can be a local-area network (LAN), such as a company Intranet, or a wide area network (WAN), such as the Internet or the World Wide Web. A user of the client node 105 can be connected to the network 115 through a variety of connections including standard telephone lines, LAN or WAN links (e.g., T1, T3, 56 kb, X.25), broadband connections (ISDN, Frame Relay, ATM), and wireless connections. The client node 105 includes a client transceiver 130 to establish communication with the network 115. The server node 110 includes a server transceiver 135 to establish communication with the network 115. The connections can be established using a variety of communication protocols (e.g., ICA, RDP, HTTP, TCP/IP, IPX, SPX, NetBIOS, Ethernet, RS232, and direct asynchronous connections).

The server node 110 can be any computing device capable of providing the requested services of the client node 105. Particularly, this includes generating and transmitting commands and data to the client node 105 that represent the output being produced by an application program 140 executing on the server 110. The server node 110 includes the server transceiver 135, the executing application program 140, a server agent 150, an output filter module 155 and an image store 160. The server agent 150 includes a module that interfaces with a client agent 175 and other components of the server node 110 to support the remote display and operability of the application program 140. The server agent module 150 and all modules mentioned throughout the specification are implemented as a software program and/or a hardware device (e.g., ASICs or FPGAs).

For clarity, all of these components are shown on server node 110. It is to be understood that the server node 110 can represent a single server or can represent several servers in communication with each over the network 115 or another network (not shown). In multiple server embodiments, the functionality of the components can be distributed over the available servers. For example, in one embodiment with multiple servers, the transceiver 135, the application program 140, the server agent 150 and the output filter module 155 are on an application server and the image store 160 is on a storage device, such as a disk in a RAID system.

The client node 105 can be any computing device (e.g., a personal computer, set top box, wireless mobile phone, handheld device, personal digital assistant, kiosk, etc.) used to provide a user interface to the application program 140 executing on the server node 110. The client node 105 includes the client transceiver 130, a display 145, a client agent 175 and a graphics library 180 (also referred to as an image-rendering library). The client agent 175 includes a module, implemented as a software program and/or a hardware device (e.g., an ASIC or an FPGA) that receives commands and data from the server node 110 and from a user (not shown) of the client node 105. The client agent 175 uses the received information when interacting with other components of the client node 105 (e.g., when directing the operating system to output data onto the display 145). The client agent 175 also transmits requests and data to the server node 110 in response to server-issued commands or user actions at the client node 105.

The server node 110 hosts one or more application programs 140 that can be accessed by the client nodes 105. Examples of such applications include word processing programs such as MICROSOFT Word and spreadsheet programs such as MICROSOFT Excel, both manufactured by Microsoft Corporation of Redmond, Wash. Other examples include financial reporting programs, customer registration programs, programs providing technical support information, customer database applications, and application set managers. Another example of an application program is Internet Explorer, manufactured by Microsoft Corporation of Redmond, Wash., and this program will be used as an exemplary application program 140 in the following discussion. It is understood that other application programs can be used.

During execution of the application program 140, for example Internet Explorer, the server node 110 communicates with the client node 105 over a transport mechanism. In one embodiment, the transport mechanism provides multiple virtual channels 185 through the network 115 so the server agent 150 can communicate with the client agent 175. One of the virtual channels 185 provides a protocol for transmitting graphical screen data from the server node 110 to the client node 105. The server 110 executes a protocol driver, in one embodiment as part of the server agent 150, that intercepts graphical display interface commands generated by the application program 140 and targeted at the server's operating system. The protocol driver translates the commands into a protocol packet suitable for transmission over the transport mechanism.

The application program 140, in this example Internet Explorer, executing on the server 110, retrieves a web page. As explained above, the application program 140 generates graphical display commands to the server operating system, as if it was going to display the output at the server node 110. The server agent 150 intercepts these commands and transmits them to the client agent 175. The client agent 175 issues the same or similar commands to the client operating system to generate output for the display 145 of the client node 105.

In one embodiment, a web page has both textual elements (e.g., titles, text, and ASCII characters) and non-textual elements (e.g., images, photos, icons, and splash screens) incorporated therein. The non-textual elements are sometimes transmitted to the Internet Explorer application program 140 from a web server (not shown) in a compressed data format (e.g., a file or a data stream), also referred to as the non-textual element's native format. Examples of compressed formats are JPEG, GIF, and PNG. The non-textual element represented in a compressed data format may be, for example, 20 kilobytes in size. That same non-textual element decompressed into its bitmap representation is, for example, 300 kilobytes in size.

The application program 140, when generating the display of the web page, retrieves, for example, a JPEG data format of a non-textual element and decompresses the JPEG data format into a bitmap for display. The output filter module 155 determines that the bitmap representation is from a compressed format and obtains the corresponding compressed format of the non-textual element from the image store 160, as explained in more detail below. In one embodiment, the image store 160 is persistent storage. In other embodiments, the image store 160 is temporary storage, cache, volatile memory and/or a combination of temporary and persistent storage.

The server agent 150 replaces the bitmap representation of the non-textual element with the compressed non-textual element that the output filter module 155 retrieved from the image store 160. The server agent 150 transmits the non-textual element in the compressed format, along with the graphical display interface commands associated with the bitmap representation, to the client node 105. In one embodiment the server agent 150 uses a unique protocol command that identifies a transmission of a non-textual element that is not in bitmap representation, even though the associated commands are applicable to a bitmap representation of a non-textual element. In other embodiments other identifying techniques can be used. For example, the protocol command can have a modifier comment, or a command switch. The command can also use a change of context or a combination of multiple commands.

The client agent 175 receives the transmission of the non-textual element file in the compressed data format, along with the graphical display interface commands associated with the bitmap representation of the non-textual element. The client agent 175 determines that the non-textual element is in the compressed data format and not the bitmap representation. In one embodiment, the client agent 175 males this determination because the non-textual element in compressed format is transmitted using a unique protocol command. In another embodiment, the size of the non-textual element data and/or other characteristics about the non-textual element included with the associated graphical display interface commands are enough to enable the client agent 175 to make the determination.

The client agent 175 determines whether the client node 105 contains the necessary library 180 to decompress the compressed format of the non-textual element. If the client node 105 has the appropriate graphics library(ies) 180 installed to perform the decompression algorithms, the client agent 175 uses the library 180 to decompress the compressed format of the non-textual element into its bitmap representation. The client agent 175 performs the received associated graphical display interface commands on the bitmap representation to generate the non-textual element of the output of the application program 140 on the client display 145.

In one embodiment, the client agent 175 does not contain all the decompression algorithms to decompress the non-textual element from a compressed format into a bitmap representation. If the client node 105 does not have the appropriate graphics library(ies) 180 installed to perform the decompression algorithms, the client agent 175 requests the needed graphics library from the server node 110. In another embodiment, the client agent 175 determines if a predetermined set of the most widely used graphics libraries 180 are installed on the client node 105 prior to receiving any non-textual elements from the server node 110. If the most widely used graphics libraries 180 are not installed on the client node 105, the client agent 175 requests the missing libraries from the server node 110 prior to receiving any non-textual elements from the server node 110.

In yet another embodiment, the client agent 175 determines which graphics libraries 180 the client node 105 includes and transmits that library information to the server agent 150. In this embodiment, when the server agent 150 receives the compressed data format of a bitmap representation from the output filter module 155, the server agent 150 determines, using the transmitted library information, whether the client node 105 can render the compressed data format. If the server agent 150 determines that the client node 105 has the applicable library, the server agent 150 substitutes the compressed data format for the bitmap representation of the non-textual element. If the server agent 150 determines that the client node 105 does not have the applicable library, the server agent 150 does not substitute the compressed data format for the bitmap representation of the non-textual element and instead transmits the bitmap representation to the client 105.

For the server agent 150 to replace the bitmap representation of the non-textual element with the non-textual element in the compressed format, the output filter module 155 determines that the bitmap representation is from a compressed format contained in the image store 160. To make this determination, the output filter module 155 calculates one or more check values for the bitmap representation. For example, the output filter module 155 can calculate a single check value for the entire bitmap representation and/or the output filter module 155 can calculate four check values, one for each quadrant for the entire bitmap representation. In another example, the output filter module 155 can calculate N check values, one for each of the N lines in the bitmap representation. A check value is the result of an algorithm that generates a substantially unique value for different arrangements of data. The check value is, for example, a checktag, a Cyclic Redundancy Code ("CRC"), a check sum, or a result of a hashing function. The check value is based on the bitmap representation and not the data as arranged in a compressed data format. However, when the compressed data format is stored in the image store 160, it is stored with a check value attribute that corresponds to the one or more check values of the bitmap representation of the compressed data when decompressed.

In one embodiment, the check value is a checktag that includes a fixed identifier and a unique identifier. The fixed identifier and the unique identifier are combined together and concealed within an image. The fixed identifier is used to identify the checktag as such; the unique identifier is used to identify a specific image. The fixed identifier is, for example, a globally unique identifier that is statistically unlikely to be found within a image. For example, the fixed identifier is a byte sequence that is easily recognizable during debugging and that has a balanced number of zero and one bits. The unique identifier is a sequential identifier uniquely allocated for each image in the cache. The sequential unique identifier is XOR masked with another value so that the image identifiers with a small value (the most likely value) will be more likely to have a balanced number of zero and one bits.

The checktag is encoded into RGB color components, independently of whether the RGB components are part of the image or part of the color palette. More specifically, the checktag is treated as a stream of 160 bits (i.e., 20 separate bytes, each of which starts at bit 0, the least significant, and finishes at bit 7, the most significant bit). The least significant bit of each byte is overwritten by the next bit of the checktag. The other 7 bits of each byte remain unaltered.

A checktag is decoded by simply reversing the encoding procedure. After the checktag is decoded, the fixed identifier and the unique identifier are retrieved from the checktag. The retrieved fixed identifier is validated against a previously stored fixed identifier to identify the checktag as such. Where a match is found, the unique identifier is then used to retrieve information that is relevant to the identified image, such as the bitmap data associated with the image.

The output filter module 155 searches the image store 160 for a non-textual element in compressed data format that has a check value attribute that is the same as one or more check values the output filter module 155 calculates for the bitmap representation. The output filter module 155 retrieves the compressed format of non-textual element with the same check value attribute as the one or more check values and sends the compressed format of the non-textual element to the server agent 150 for transmittal to the client agent 175 in place of the bitmap representation.

The server node 110 stores compressed formats of non-textual elements in the image store 160 the first time the application program 140 calls a graphics library (not shown) to create a bitmap representation from a compressed format file. The output filter module 155 calculates the associated check value of the bitmap representation as the application program 140 decompresses the compressed format and generates the bitmap representation. As described above, the output filter module 155 can calculate the check value when the bitmap representation is complete, when a quadrant of the bitmap representation is complete, or when a line of the bitmap representation is complete. The server 110 stores the compressed format file and the associated check value attribute in the image store 160 and retrieves the compressed format file the first and any subsequent times the application program 140 generates the associated non-textual element.

Whether the server 110 stores the compressed format file and its associated check value attribute(s) in the image store 160 in a temporary portion (e.g., RAM memory buffer or cache) or a persistent portion (e.g., disk or non-volatile memory buffer) is based at least in part on design and hardware limitations (e.g., the size of the persistent storage). One exemplary criterion used to make that determination is the number of times the application program 140 generates the non-textual element. For example, if the application program 140 generates a particular non-textual element more than a predetermined number of times, the server 110 stores the compressed format file and its associated check value attribute(s) corresponding to that particular non-textual element persistently in the image store 160.

In other embodiments, the server 110 stores the non-textual element if it is static or complex. For example, if the application program 140 always generates a splash screen at initialization, the server 110 stores the compressed format file corresponding to that splash screen in the persistent portion of the image store 160. In another embodiment, if the non-textual element is complex, static and/or generated repeatedly but does not have a corresponding compressed format file, the output filter module 155 generates a compressed format file for that non-textual element, in a standards-based or proprietary-based format. In any subsequent transmissions, the server agent 150 transmits the generated compressed format file in place of the bitmap representation. If the compressed format is a proprietary-based format, the server agent 150 determines whether the client node 105 includes the applicable proprietary-based graphics library to decompress the compressed format file into a bitmap representation. If not included on the client node 105, the server agent 150 transmits the applicable library to the client node 105 for installation.

Although the illustrated embodiment depicts the image store 160 on the server node 110, in an alternate embodiment, at least a portion of the image store (not shown) is on the client node 105. In this alternate embodiment, the output filter module 155 calculates the one or more check values of the bitmap representation and transmits the one or more check values to the server agent 150. The server agent 150 transmits these one or more check values to the client agent 175. The client agent 175 searches the portion of the image store on the client node 105 for a compressed data format stored with an identical one or more check values attribute. The client agent 175 transmits the results of this search to the server agent 150.

If the compressed data format for the non-textual element exists on the client node 105, the server agent 150 does not have to send either the compressed data format or the bitmap representation over the network 115. The server agent 150 only transmits the graphical display interface commands associated with the bitmap representation of the non-textual element. If the compressed data format for the non-textual element does not exist on the client node 105, the output filter module 155 obtains the corresponding compressed format of the non-textual element from the image store 160. The server agent 150 replaces the bitmap representation of the non-textual element with the non-textual element in the compressed data format that the output filter module 155 retrieved from the image store 160. The server agent 150 transmits the non-textual element in the compressed format, along with the graphical display interface commands associated with the bitmap representation, to the client node 105.

Figure 2:
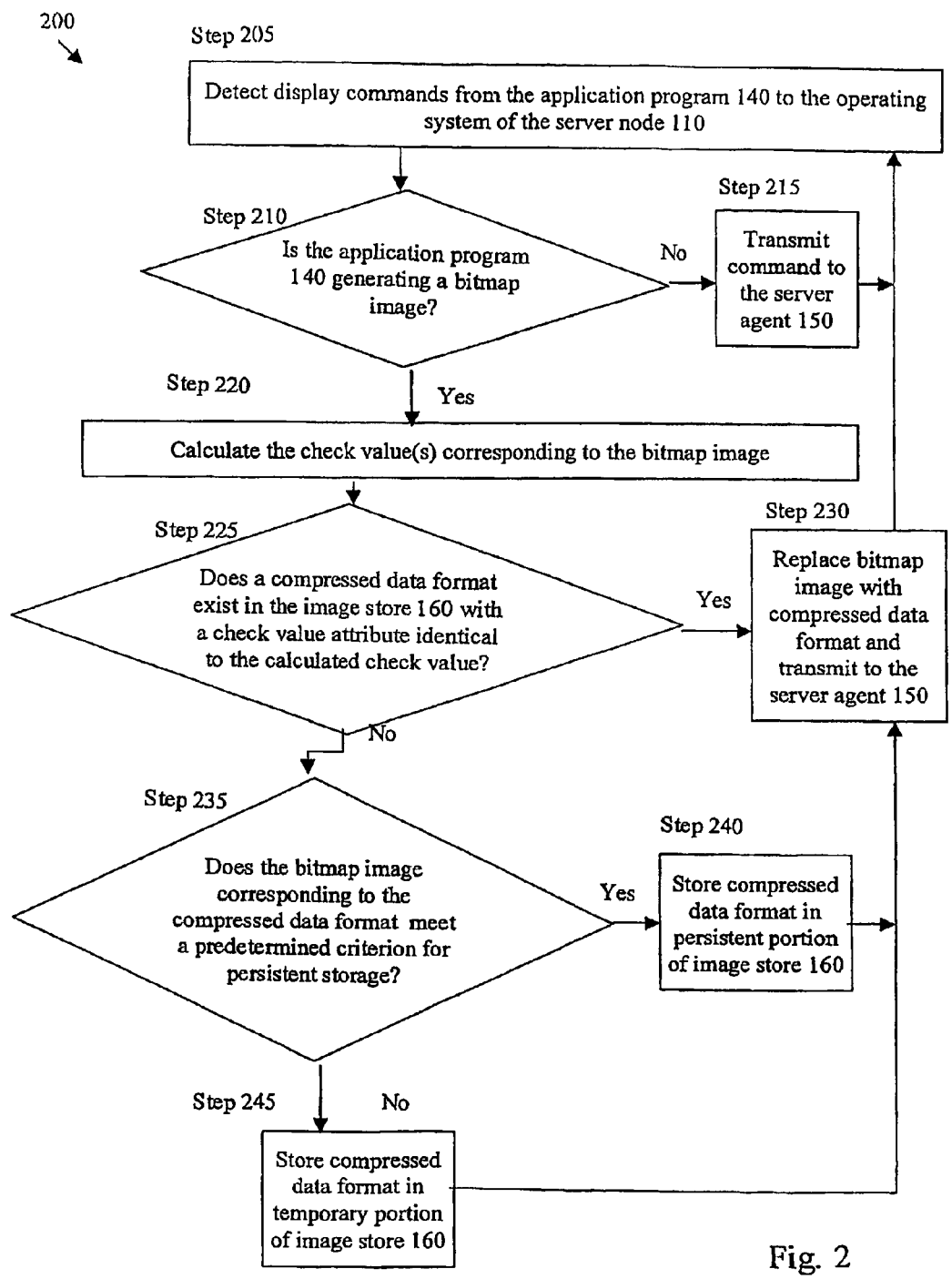
FIG. 2 is a flow diagram of an illustrative embodiment of a process to generate a graphical display for a remote terminal session in accordance with the invention.

FIG. 2 illustrates an exemplary embodiment of a process 200 to generate a display for a remote terminal session, using the exemplary embodiment of FIG. 1. The output filter module 155 monitors the output of the application program 140 by monitoring calls made to the operating system of the server node 110. When the output filter module 155 detects (step 205) a display command from the application program 140, the output module 155 determines (step 210) whether the application program 140 is generating a bitmap representation of a non-textual element.

If the application program 140 is not generating a bitmap representation of a non-textual element, the output filter module 155 transmits (step 215) the display command to the server agent 150, which transmits that command, or a representative command defined in the protocol, to the client agent 175. If the application program 140 is generating a bitmap representation of a non-textual element, the output filter module 155 calculates (step 220) one or more check values corresponding to the bitmap representation of the non-textual image.

Using the one or more calculated check value(s), the output filter module 155 searches the image store 160 to determine (step 225) whether a compressed data format with identical check value attribute(s) exists. If there is a compressed data format in the image store 160 with check value attribute(s) identical to the one or more check values the output filter module 155 calculates, the output module 155 replaces (step 230) the bitmap representation of the non-textual element with the compressed data format. The output module 155 transmits (step 230) the compressed data format to the server agent 150 for eventual transmission to the client agent 175. The output module 155 also transmits all of the commands associated with the replaced bitmap representation along with the compressed data format.

If there is not a compressed data format with identical one or more check value attributes in the image store 160, the output module 155 determines (step 235) whether the bitmap representation of a non-textual element corresponding to the compressed data format meets a predetermined criterion for persistent storage (e.g., any of the criteria described above). If the output module 155 determines (step 235) that the predetermined criterion is met, the output module 155 stores (step 240) the compressed data format and the corresponding check value attribute, identical to the one or more calculated check values, in the persistent portion of the image store 160. If the output module 155 determines (step 235) that the predetermined criterion is not met, the output module 155 stores (step 245) the compressed data format and the corresponding check value attribute, identical to the one or more calculated check values, in the temporary portion of the image store 160.

Once the output module 155 stores (step 240 or 245) the compressed data format and the corresponding check value attribute, identical to the one or more calculated check values, in the image store 160, the output module 155 replaces (step 230) the bitmap representation of the non-textual element with the compressed data format. The output module 155 transmits (step 230) the compressed data format to the server agent 150 for eventual transmission to the client agent 175. The output module 155 continues monitoring the output generated by the application program 140 until the output module 155 detects (step 205) another display command from the application program 140.

In another aspect, the invention pertains to methods, systems, and articles of manufacture for generating a media presentation. In one embodiment, a compressed data set, representing at least a portion of a media stream, is intercepted on a first computing device and transmitted, over a network, to a second computing device, where it is decompressed and presented to a user. In another embodiment, a decompressed data set, representing at least a portion of a media stream, is intercepted and compressed on the first computing device and then transmitted, as above, to the second computing device, where it is again decompressed and presented to the user.

Figure 3:
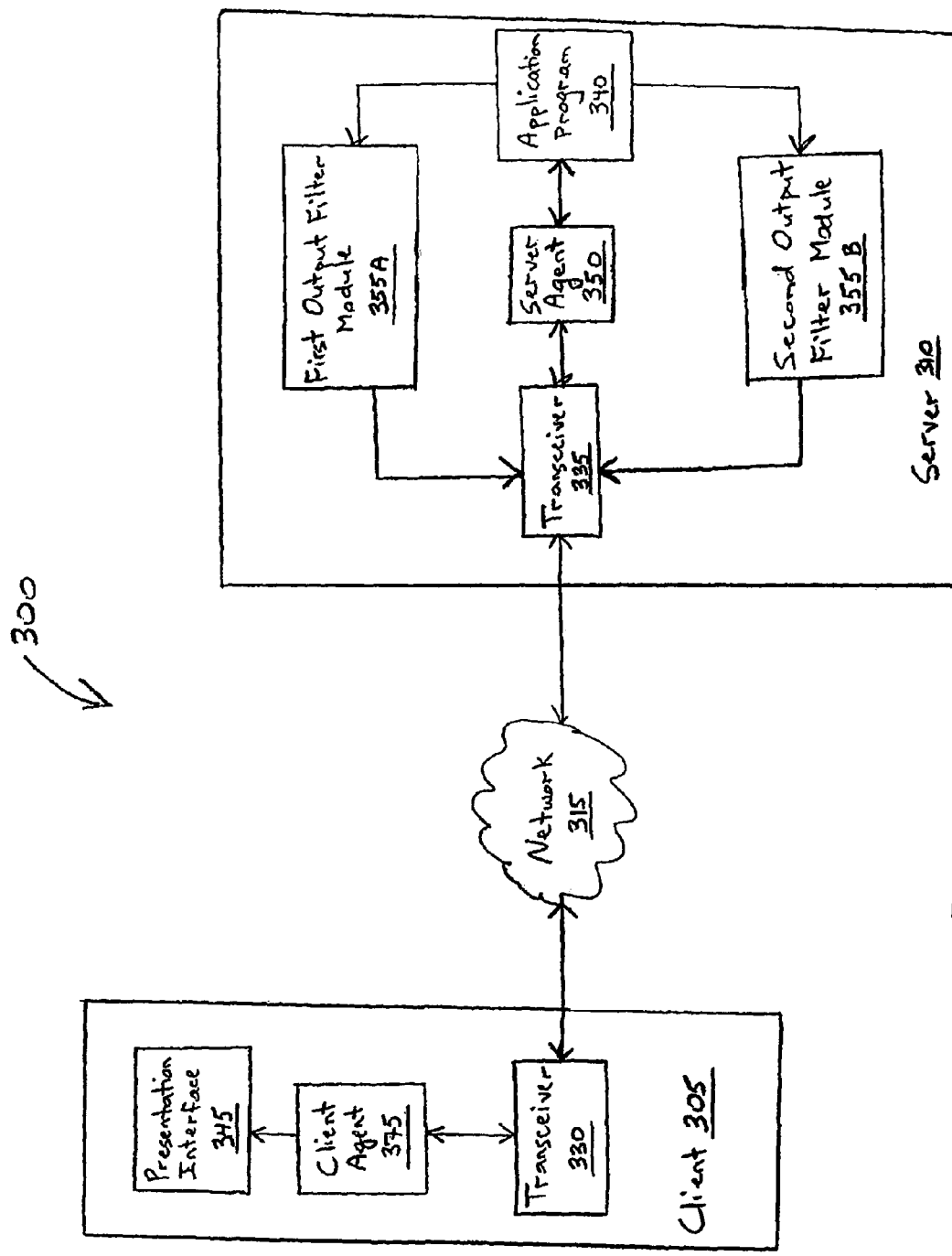
FIG. 3 is a block diagram of an illustrative embodiment of a system for generating a media presentation at a client in accordance with the invention.

FIG. 3 illustrates one embodiment of a system 300 that generates a media presentation according to this aspect of the invention. The system 300 includes a first computing device, e.g., a server 310, in communication with a second computing device, e.g., a client 305, over a network 315. Generally speaking, except as set forth below, the client 305, the server 310, and the network 315 have the same capabilities as the client 105, the server 110, and the network 115, respectively, described above.

As shown, the client 305 includes at least a client transceiver 330, a client agent 375, and a presentation interface 345. The client agent 375 may be implemented as a software program and/or as a hardware device, such as, for example, an ASIC or an FPGA. The client agent 375 uses the client transceiver 330 to communicate over the network 315 and generates a presentation having media and non-media components at the presentation interface 345.

In one embodiment, the server 310 is an application server. As illustrated, the server 310 includes at least a server transceiver 335, an application program 340, a server agent 350, a first output filter module 355A, and a second output filter module 355B. The server agent 350, the first output filter module 355A, and the second output filter module 355B may be implemented as a software program and/or as a hardware device, such as, for example, an ASIC or an FPGA. The server agent 350, the first output filter module 355A, and the second output filter module 355B use the server transceiver 335 to communicate over the network 315.

In another embodiment, the aforementioned components 335, 340, 350, 355A, and 355B are distributed over several servers in communication with each other over the network 315, or over another network (not shown). Alternatively, in yet another embodiment, two or more of the aforementioned components 335, 350, 355A, and 355B may be combined into a single component, such that the functions, as described below, performed by two or more of the components 335, 350, 355A, and 355B are performed by the single component.

The application program 340 illustrated in FIG. 3 is any application program 340 that renders, as part of its output, a media stream. The media stream may be a video stream, an audio stream, or, alternatively, a combination thereof. In addition, the application program 340 may output non-media graphical information. In this context, non-media graphical information refers generally to all graphical information outputted by the application program 340 without the use of a codec or the equivalent, such as, for example, static graphical information, including, but not limited to, toolbars and drop-down menus. Non-media graphical information also includes, for example, information for locating the static graphical information on a display screen. The application program 340 may be, for example, the MICROSOFT ENCARTA application program manufactured by the Microsoft Corporation of Redmond, Wash.

In one embodiment, the application program 340 uses external codecs, such as, for example, codecs installed in the operating system of the server 310, to decompress a compressed data set representing at least a portion of a media stream. In another embodiment, the codecs used by the application program 340 are embedded in the application program 340 itself. In yet another embodiment, the server 310 may include any number of executing application programs 340, some of which use external codecs, others of which use embedded codecs.

Where the application program 340 uses external codecs and desires to output a media stream, it requests that the operating system of the server 310 use the external codecs to decompress the compressed data set representing at least a portion of the media stream for subsequent display. Where the codecs used by the application program 340 are embedded in the application program 340 itself, the application program 340, when desiring to output a media stream, uses the embedded codecs to decompress the compressed data set itself for subsequent display. Additionally, the application program 340 may generate and transmit graphical display commands, associated with the non-media graphical information, to the operating system of the server 310.

In accordance with the present invention, the application program 340 performs these tasks as if the application program 340 was going to generate a presentation having media and non-media components at the server 310. As explained below, the first output filter module 355A, the second output filter module 355B, and the server agent 350 intercept the compressed data set being passed to the external codecs, the decompressed data set generated by the embedded codecs, and the graphical display commands associated with the non-media graphical information, respectively, and (after first compressing the decompressed data set generated by the embedded codecs) transmit them, over the network 315, to the client agent 375. The client agent 375, as explained below, then decompresses the received compressed data sets and issues the same or similar graphical display commands, associated with the non-media graphical information, to the operating system of the client 305 to generate a presentation having media and non-media components at the presentation interface 345 of the client 305.

The first output filter module 355A and the second output filter module 355B are invoked as an application program 340 using external codecs attempts to invoke an external codec to output a media stream. The first output filter module 355A intercepts an original compressed data set representing at least a portion of the media stream. Instead of decompressing the data set, as an external codec would, the first output filter module 355A transmits the original compressed data set over the network 315 to the client agent 375. Where the media stream includes a video stream, the second output filter module 355B acting as an OS-level renderer captures information for locating images of the video stream on a display screen and transmits the information over the network 315 to the client agent 375.

In another embodiment, when an application program 340 that uses embedded codecs attempts to invoke, for example, an OS-level renderer to output a media stream, the second output filter module 355B is invoked. The second output filter module 355B intercepts a first decompressed data set representing at least a portion of the media stream from the output of the application program 340. The second output filter module 355B then compresses, as explained below, the intercepted first decompressed data set and transmits the resulting compressed data set, over the network 315, to the client agent 375. The second output filter module 355B, as above, also captures, where the media stream includes a video stream, information for locating images of the video stream on a display screen and transmits the information over the network 315 to the client agent 375.

In another embodiment, the server agent 350 intercepts and transmits to the client agent 375, over the network 315, the graphical display commands associated with the non-media graphical information outputted by the application program 340.

Additionally, in one embodiment, the first output filter module 355A, the second output filter module 355B or both (where the application program 340 uses external codecs), or the second output filter module 355B (where the application program 340 uses embedded codecs), captures timing information associated with the media stream and transmits the timing information, over the network 315, to the client agent 375. More specifically, the output filter module 355A, 355B captures, and transmits to the client agent 375, presentation times for each frame of the media stream, thereby enabling the client agent 375 to synchronize video and audio streams and to maintain the correct frame rate.

As shown, the server agent 350 interfaces with the server transceiver 335 and the application program 340. In one embodiment, as explained below, the server agent 350 receives from the client agent 375, over the network 315, a list of media formats supported by the client agent 375. Upon receiving the list of supported media formats, the server agent 350 registers the output filter modules 355A, 355B by manipulating the configuration of the server 310. In one embodiment, for example, the server agent 350 registers the output filter modules 355A, 355B by editing the registry of the server 310. The server agent 350 then informs the client agent 375 that the server 310 can handle all such media formats.

At the client 305, the client agent 375 interfaces with the client transceiver 330 and the presentation interface 345. The client agent 375, as described below, initially informs the server agent 350 of the media formats supported by the client agent 375. The client agent 375 also receives from the output filter modules 355A, 355B, over the network 315, the compressed data set and any associated timing information. Moreover, the client agent 375 receives over the network 315, from the second output filter module 355B, any information for locating images of a video stream on a display screen and, from the server agent 350, the graphical display commands associated with the non-media graphical information.

The client agent 375, using either external or embedded codecs, decompresses the compressed data set and, together with the graphical display commands associated with the non-media graphical information, any information for locating images of a video stream on a display screen, and any timing information, generates a media presentation at the presentation interface 345. The presentation interface 345 has, in one embodiment, a display screen that renders a graphical display, such as, for example, a video presentation. In another embodiment, the presentation interface 345 includes a speaker that renders an audio presentation. The client 305 may include any number of presentation interfaces 345.

The information provided in specifying the media formats supported by the client agent 375 may determine the mode of operation at the server 310. If the compressed data set is in a format that is not supported by the client agent 375, the second output filter module 355B may recompress the decompressed data set into a supported format.

Figure 4A:
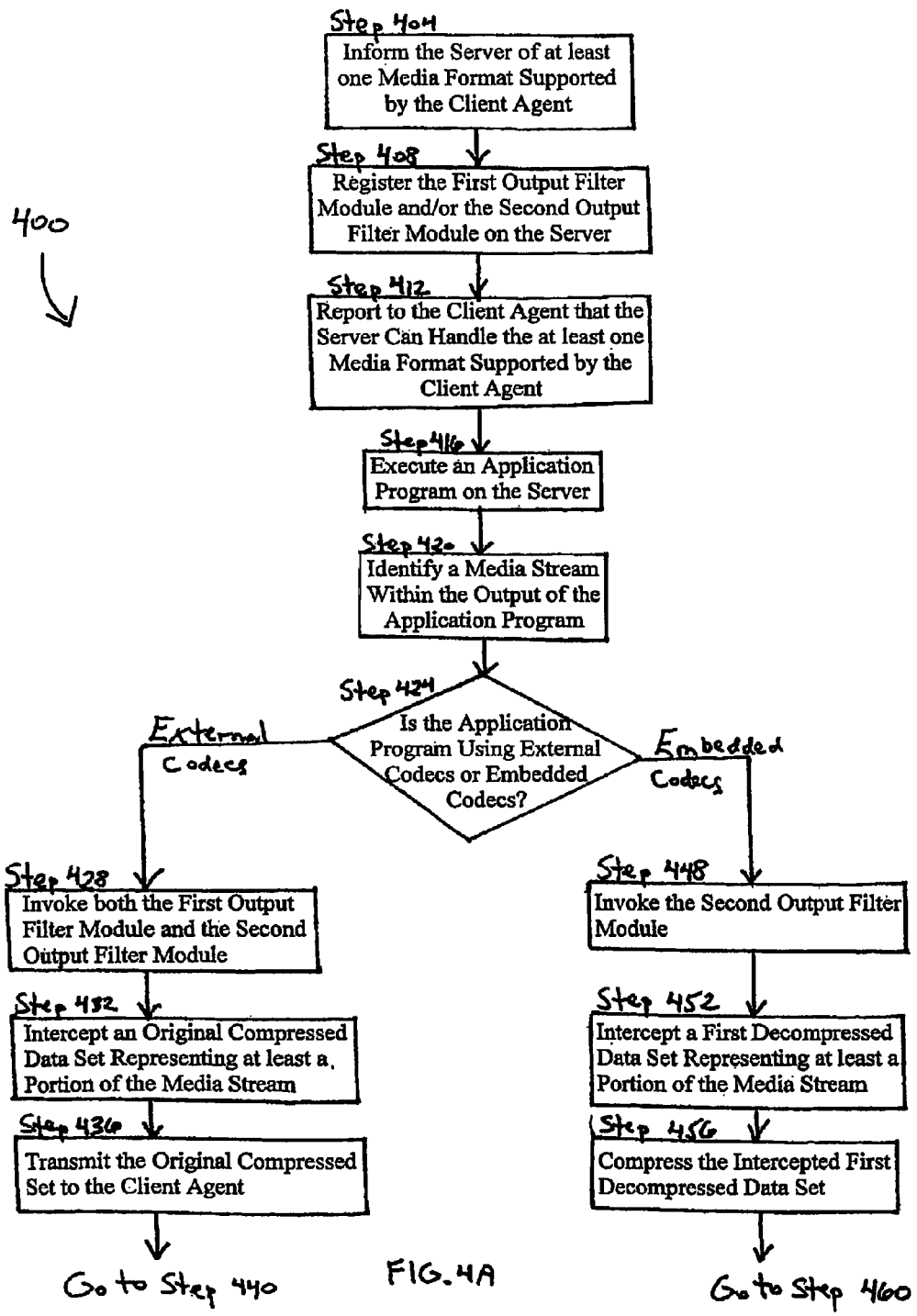
FIGS. 4A, 4B, & 4C are a flow diagram of an illustrative embodiment of a method for generating a media presentation at a client in accordance with the invention.
Figure 4B:
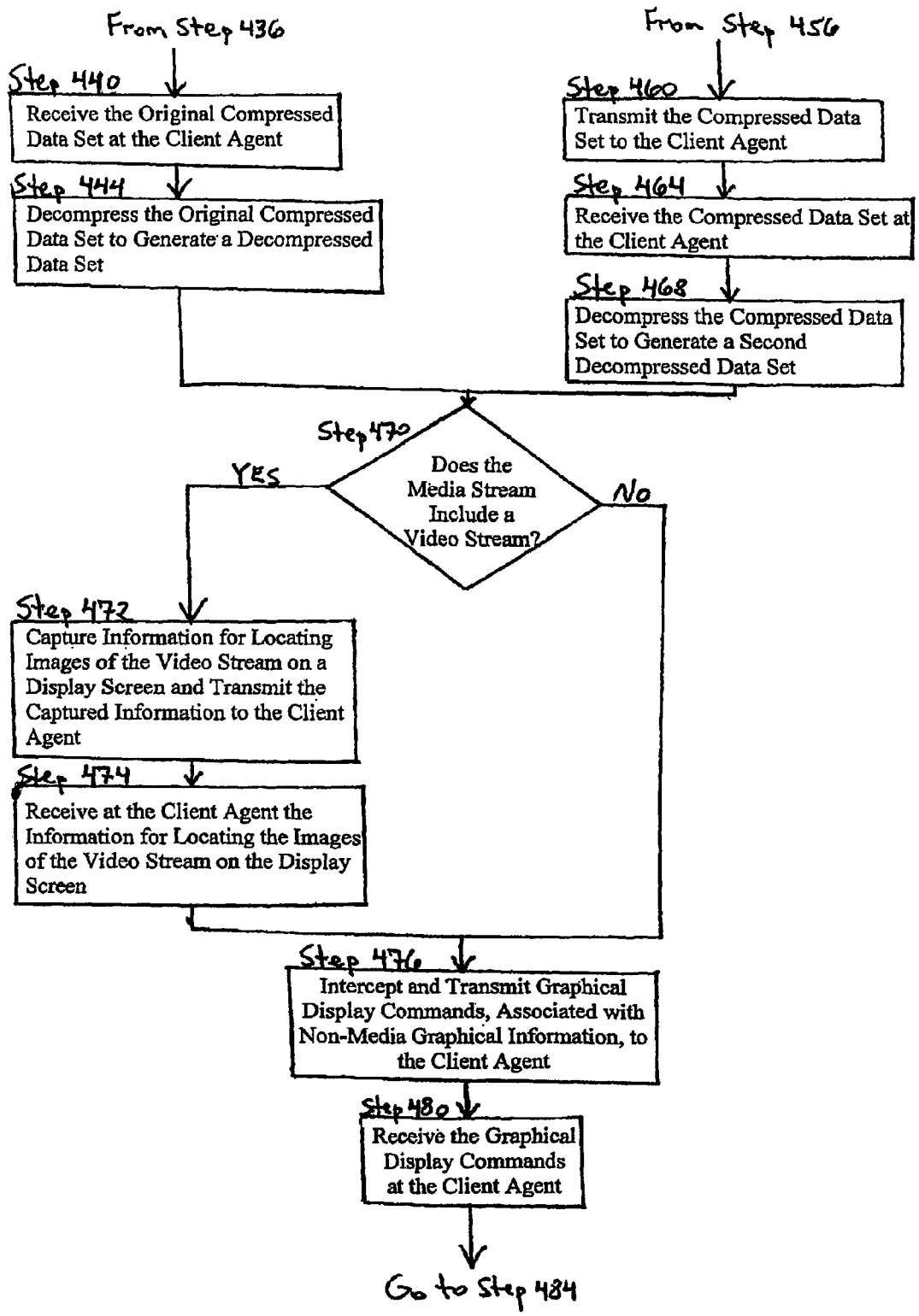
Figure 4C:
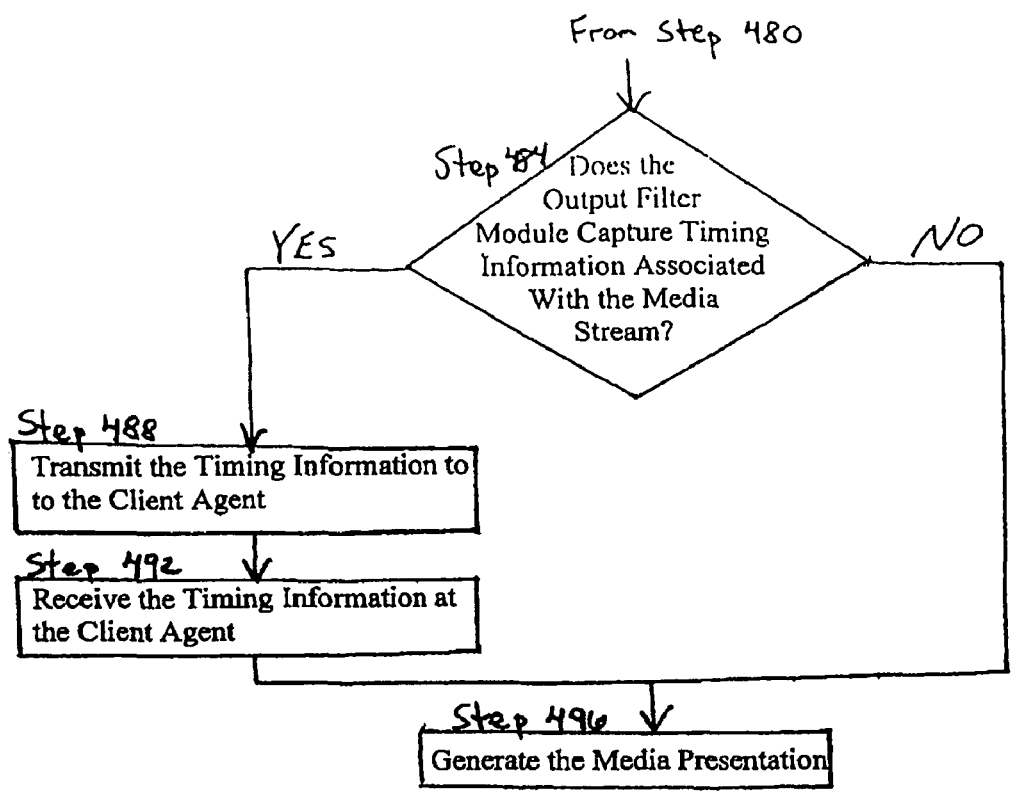

Referring now to FIGS. 4A, 4B, and 4C, one embodiment of a method 400 that generates a media presentation at the client 305, using the exemplary embodiment of FIG. 3, is illustrated. When the client 305 and the server 310 are both connected to the network 315, the client agent 375, at step 404, informs the server agent 350 of all the media formats supported by the client agent 375. In one embodiment, the list of supported media formats is created by enumerating the external codecs installed on the client 305. For example, the codecs installed in the operating system of the client 305 are enumerated by the client agent 375, over the network 315, to the server agent 350. In another embodiment, the list of supported media formats is created by enumerating the codecs embedded in the client agent 375. For example, where the client agent 375 is implemented as a software program, the codecs embedded in the software program are enumerated by the client agent 375, over the network 315, to the server agent 350. Alternatively, the client agent 375 creates the list of supported media formats, and informs the server agent 350 of those supported media formats, by enumerating both the external codecs installed on the client 305 and the codecs embedded in the client agent 375.

In one embodiment, the client agent 375 generates globally unique identifiers ("GUIDs") and associates each GUID with a particular codec. The client agent 375 then transmits the list of generated GUIDs to the server agent 350 to inform the server agent 350 of the media formats supported by the client agent 375. In another embodiment, the client agent 375 transmits a list of four character codes, each four character code being associated with a particular codec, to the server agent 350 to inform the server agent 350 of the media formats supported by the client agent 375.

Upon receiving the list of supported media formats from the client agent 375, the server agent 350 registers, at step 408, the first output filter module 355A and/or the second output filter module 355B on the server 310, as associated with the supported media formats. The server agent 350, at step 412, then reports back to the client agent 375 that the server 310 can handle all of the enumerated media formats.

At step 416, an application program 340 starts executing on the server 310. When the application program 340 identifies within its output, at step 420, the presence of media content, such as, for example, a media stream, the first output filter module 355A, the second output filter module 355B, or both are invoked. If, at step 424, the application program 340 uses external codecs, both the first output filter module 355A and the second output filter module 355B are invoked at step 428 as the application program 340 attempts to invoke an external codec. The first output filter module 355A then intercepts, at step 432, an original compressed data set representing at least a portion of the media stream and transmits, at step 436, the original compressed data set to the client agent 375, without decompressing the data set. The client agent 375, at step 440, receives the original compressed data set and decompresses, at step 444, the original compressed data set to generate a decompressed data set. The client agent 375 uses either external codecs installed on the client 305 or codecs embedded in the client agent 375 itself to decompress the original compressed data set.

If, instead, at step 424, the application program 340 uses codecs embedded in the application program 340 itself, the second output filter module 355B is, at step 448, invoked as the application program 340 attempts to invoke an OS-level renderer to display the decompressed data set. The second output filter module 355B then intercepts, at step 452, a first decompressed data set, representing at least a portion of the media stream, from the output of the application program 340 and compresses, at step 456, the intercepted first decompressed data set. A variety of compression techniques, including both lossy compression techniques and lossless compression techniques, may be used by the second output filter module 355B, at step 456, to compress the media stream.

Where the media stream is a video stream, the intercepted first decompressed data set may be compressed, at step 456, by the second output filter module 355B using, for example, a lightweight lossy video encoding algorithm, such as, for example, MJPEG compression. In using the lightweight lossy video encoding algorithm, the second output filter module 355B may choose the desired compression ratio or it may use a predetermined compression ratio. The degree of quality loss chosen by the second output filter module 355B will, typically, depend on the available bandwidth of the network connection. For example, where a user of the client 305 uses a slow modem to connect to the network 315, the second output filter module 355B may choose to use low quality video. Where, on the other hand, a user of the client 305 uses a LAN link or a broadband connection to connect to the network 315, the second output filter module 355B may choose to use a higher quality video.

Following compression of the intercepted first decompressed data set at step 456, the second output filter module 355B transmits, at step 460, the compressed data set to the client agent 375 in place of the first decompressed data set. The client agent 375, at step 464, receives the compressed data set and decompresses, at step 468, the compressed data set to generate a second decompressed data set. Again, the client agent 375 uses either external codecs installed on the client 305 or codecs embedded in the client agent 375 itself to decompress the compressed data set.

Regardless of whether the application program 340 uses external or embedded codecs, where the media stream, at step 470, includes a video stream, the second output filter module 355B, at step 472, captures information for locating images of the video stream on a display screen and transmits the captured information over the network 315 to the client agent 375. The client agent 375, at step 474, receives the information for locating the images of the video stream on the display screen.

Regardless, again, of whether the application program 340 uses external or embedded codecs and regardless, moreover, of whether the media stream, at step 470, includes a video stream, the server agent 350, at step 476, intercepts and transmits, over the network 315, graphical display commands, associated with the non-media graphical information outputted by the application program 340, to the client agent 375. The client agent 375, at step 480, receives the graphical display commands associated with the non-media graphical information.

Where, at step 484, the output filter module 355A, 355B captures timing information associated with the media stream, the output filter module 355A, 355B transmits, at step 488, the timing information to the client agent 375. The client agent 375 receives, at step 492, the timing information and generates, at step 496, the media presentation at the presentation interface 345. To generate the media presentation at the presentation interface 345, the client agent 375 uses the timing information, the graphical display commands associated with the non-media graphical information, and, where the media stream includes a video stream, the information for locating the images of the video stream on a display screen to seamlessly combine the decompressed data set (or, more specifically, where the application program 340 uses embedded codecs, the second decompressed data set) with the non-media graphical information.

Where the output filter module 355A, 355B does not capture timing information associated with the media stream, the client agent 375 generates, at step 496, the media presentation at the presentation interface 345 using only the decompressed data set (or, more specifically, where the application program 340 uses embedded codecs, the second decompressed data set), the graphical display commands associated with the non-media graphical information, and, where the media stream includes a video stream, the information for locating the images of the video stream on a display screen.

The present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

EQUIVALENTS

The invention can be embodied in other specific forms without departing from the spirit or essential characteristics thereof. In particular, it is understood that a single server may implement both the invention of FIGS. 1 & 2 and the invention of FIGS. 3, 4A, 4B, & 4C. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for generating a graphical display at a client, the method comprising:
   monitoring output produced by an application program executing on a server,
   the output comprising a non-textual element and a textual element;
   transmitting the textual element of the output from the application program on the server to the client;
   identifying a bitmap representation of the non-textual element within the application output;
   retrieving a compressed data format associated with the bitmap representation of the non-textual element; and
   transmitting to the client the compressed data format in place of the bitmap representation of the non-textual element.

2. The method of claim 1 wherein the compressed data format is transmitted using at least one presentation layer protocol packet.

3. The method of claim 2 wherein the at least one presentation layer protocol packet is transmitted using a command for transmitting a file in its native format.

4. The method of claim 2 wherein the at least one presentation layer protocol packet conforms to a remote access protocol.

5. The method of claim 1 further comprising determining the capability of the client to render the non-textual element using the compressed data format.

6. The method of claim 5 further comprising, upon determination that the client cannot render the non-textual element using the compressed data format, transmitting an image-rendering library capable of rendering the non-textual element using the compressed data format.

7. The method of claim 1 further comprising: receiving the compressed data format at the client; and generating a display at the client using the compressed data format.

8. The method of claim 1 further comprising: identifying the textual element within the application output; and transmitting to the client the textual element.

9. The method of claim 1 further comprising: receiving the compressed data format and the textual element at the client; and generating a display at the client using the compressed data format and the textual element.

10. The method of claim 1 wherein the non-textual element is the bitmap representation and wherein the step of transmitting the compressed data format comprises replacing the bitmap representation with the compressed data format.

11. The method of claim 1 wherein the step of identifying further comprises:
    intercepting the application output; and inspecting the intercepted output for a bitmap representation of the non-textual element.

12. The method of claim 1 wherein the step of retrieving further comprises:
    calculating a first check value for a bitmap representation of the non-textual element; and
    searching an image store for the compressed data format having a check value identical to the first check value.

13. A method for generating a graphical display at a client, the method comprising:
    monitoring output produced by an application program executing on a server,
    the output comprising a non-textual element and a textual element;
    transmitting the textual element of the output from the application on the server to the client;
    identifying a bitmap representation of the non-textual element within the application output;
    determining a check value for the bitmap representation;
    retrieving a compressed data format of the bitmap representation from a data store based at least in part on matching the determined check value with a check value present in the data store; and
    transmitting to the client the retrieved compressed data format in place of the bitmap representation.

14. The method of claim 13 wherein the compressed data format and a command associated with displaying the bitmap representation are transmitted using a presentation layer protocol packet.

15. The method of claim 14 wherein the presentation layer protocol packet is transmitted using a protocol command established for transmitting a file in its compressed data format.

16. The method of claim 14 wherein the presentation layer protocol packet is conformed to a presentation protocol.

17. The method of claim 13 former comprising determining the capability of the client to render the bitmap representation using the compressed data format.

18. The method of claim 17 further comprising, upon determination that the client cannot render the bitmap representation using the compressed data format, transmitting an image-rendering library capable of rendering the bitmap representation using the compressed data format.

19. The method of claim 13 further comprising: identifying a command associated with the bitmap representation within the application output; and transmitting to the client the command along with the compressed data format.

20. The method of claim 19 further comprising: receiving the compressed data format and the command at the client; decompressing the compressed data format to generate the bitmap representation; and generating a display using the bitmap representation and the command.

21. The method of claim 13 wherein the step of identifying further comprises:
    intercepting the application output; and inspecting the intercepted output for a bitmap representation of one or more non-textual elements.

22. The method of claim 13 wherein the step of determining further comprises:
    calculating a CRC based on the bitmap representation; and using the calculated CRC as the check value.

23. A system for generating a graphical display at a client device, the system comprising:
    an output filter module configured on a server device to monitor output produced by an application program executing on the server device, the output comprising a non-textual element and a textual element, the output filter module further configured to intercept output produced by the application program, transmit the textual element from application program on the server device to the client device, identify a bitmap representation of the non-textual element of the output and retrieve a compressed data format associated with the bitmap representation of the non-textual element; and
    a server agent configured on the server device to transmit to the client device the compressed data format in place of the bitmap representation of the non-textual element.

24. The system of claim 23 further comprising: a client agent configured on the client device to receive the compressed data format and to generate a display of the non-textual element using the received compressed data format.

25. The system of claim 24 further comprising a client node, the client node including the client agent and a display.

26. The system of claim 23 wherein the server agent is further configured to transmit the compressed data format using a presentation layer protocol packet.

27. The system of claim 26 wherein the server agent is further configured to include a command in the presentation layer protocol packet for transmitting the compressed data format in place of the non-textual element.

28. The system of claim 23 wherein the output filter module is further configured to determine whether the client device is capable of rendering the non-textual element using the compressed data format.

29. The system of claim 28 wherein the server agent is further configured to transmit an image-rendering library capable of rendering the non-textual element using the compressed data format upon determination that the client device cannot render the non-textual element using the compressed data format.

30. The system of claim 23 further comprising a server node, the server node including the server agent and the output filter module.

31. The system of claim 23 wherein the server agent is further configured to conform to a thin client protocol.

32. The system of claim 23 wherein the non-textual element is a bitmap representation.

33. The system of claim 23 wherein the output filter module is further configured to intercept the output and inspect the intercepted output for a bitmap representation of a non-textual element.

34. A system for generating a graphical display at a client device, the system comprising:
    a network;
    a server device in communication with the network, the server device including, an output filter module configured to monitor output produced by an application program executing on the server device, the output comprising a textual element and a non-textual element, the output filter module further configured to intercept output produced by the application program, identify a bitmap representation of the non-textual element of the output, determine a check value for the bitmap representation and retrieve a compressed data format of the bitmap representation from a data store based at least in part on matching the determined check value with a check value present in the data store; and a server agent in communication with the output filter module, the server agent configured to transmit to the client device the textual element of the output and the retrieved compressed data format in place of the non-textual element; and
    the client device in communication with the network, the client device including, a client agent in communication with the server agent, the client agent configured to receive the compressed data format and to generate a display of the non-textual element using the received compressed data format.

35. An article of manufacture having computer-readable program means embodied therein for generating a graphical display at a client, the article comprising:
    computer-readable program means for monitoring output produced by an application program executing on a server, the output comprising a non-textual and a textual element;
    computer-readable program means for intercepting output produced by the application program on the server;
    computer-readable program means for identifying a bitmap representation of the non-textual element of the output;
    computer-readable program means for retrieving a compressed data format associated with the bitmap representation of the non-textual element; and
    computer-readable program means for transmitting to the client the textual element of the output and the retrieved compressed data format in place of the non-textual element.

36. An article of manufacture having computer-readable program means embodied therein for generating a graphical display at a client, the article comprising:

computer-readable program means for monitoring output produced by an application program executing on a server, the output comprising a non-textual element and a textual element;

computer-readable program means for intercepting output produced by the application program on the server;

computer-readable program means for identifying a bitmap representation of the non-textual element within the output produced by the application program;

computer-readable program means for determining a check value for the bitmap representation;

computer-readable program means for retrieving a compressed data format of the bitmap representation from a data store based at least in part on matching the determined check value with a check value present in the data store; and computer-readable program means for transmitting to the client the textual element of the output and the retrieved compressed data format in place of the bitmap representation.

* * * * *